INVENTORS
JAMES W. ROSS
JOHN H. RISEMAN

BY

ATTORNEYS

United States Patent Office
3,333,185
Patented July 25, 1967

3,333,185
ELECTRONIC DEVICE FOR EXTRAPOLATING
EXPONENTIAL SIGNALS
John H. Riseman, Cambridge, and James W. Ross, Newton, Mass., assignors to Corning Glass Works, Corning, N.Y., a corporation of New York
Filed Dec. 30, 1963, Ser. No. 334,283
4 Claims. (Cl. 324—30)

This invention relates to measuring instrumentation, and more particularly to apparatus, typically electronic, including means for extrapolating the transient response of a transducer to obtain, in a reduced time period, the steady-state value toward which the response approaches.

To a change in a parameter being measured, certain transducers providing an electrical output exhibit a transient response which approaches, substantially as an exponential function in time, a steady-state value. For example, while in transducers functioning according to electronic charge-conduction phenomena, appreciable changes in potential are usually virtually instantaneous (e.g. several millivolts in nanoseconds), in a transducer which operates in accordance with ionic-charge transfer phenomena, the time required to indicate a potential shift in the parameter being measured may be several orders of magnitude greater.

A particular example of transducers employing ionic-charge transfer to measure electrochemical values may be found in transducers such as one of the ion-sensitive glass electrodes which are employed to measure the concentration of ions, such as sodium ions, in solution. Electrodes of this type typically exhibit bulk resistivities of approximately $1 \times 10^{-10}$ ohm-cm. and the EMF developed by such a glass electrode is in the order of millivolts. Consequently, the electronic instrumentation responsive to the output of such electrode must be capable of measuring potential differences derived from an extremely high impedance source. The response time of such a glass electrode system is often in the order of minutes before a stable reading can be made, the transient response of the electrode being substantially exponential in time. While for some purposes, this presents no problem, in many industrial process monitoring or control systems it is desirable to have the steady-state value available at an early point in the transient period so that operations can be conducted on a real-time basis, or very close thereto.

It is therefore a principal object of the present invention to provide an instrumentation system which reduces the exponential time lag heretofore found in the transient response time of transducers, particularly transducers for measuring ionic concentrations. Another object of the invention is to provide electronic instrumentation in combination with an electrode having a steady-state output proportional to a measured concentration of ions in solution, and a read-out device which operates on the transient signal output of the electrode to extrapolate said signal and provide a reasonably accurate prediction of the steady-state value.

Yet another object of the present invention is to provide a combination of ion-concentration sensitive electrode means having, in response to a change in the ion concentration being measured, a substantially exponential voltage-time response, and computer means responsive to the output of said electrode means for extrapolating said response to approximate its ultimate asymptotic or steady-state value, whereby the steady-state value becomes available in an accelerated manner.

Other objects of the present invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 1:
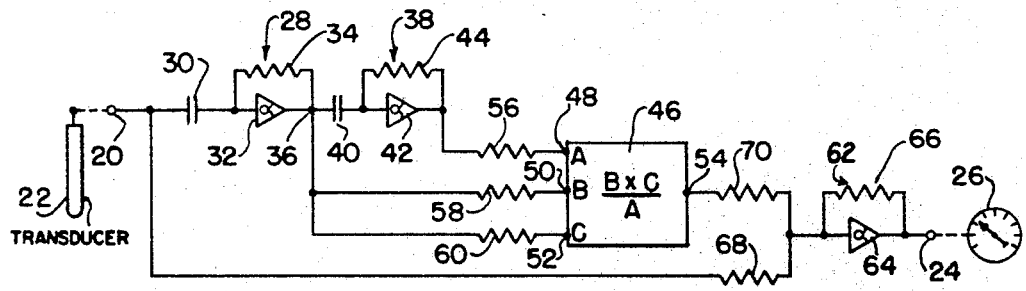
FIGURE 1 is a schematic circuit diagram, partly in block form, of a preferred embodiment of the present invention.

Referring now to FIGURE 1, there will be seen electronic circuitry embodying the principles of the present invention and including an input terminal 20 at which a signal from a transducer, such as ion-sensitive glass electrode 22, is intended to be applied. Electrode 22 is characterized in having a transient response which is substantially exponential in time toward an approximately steady-state or asymptotic value. The circuit includes output terminal 24 at which a corrected or extrapolated signal is intended to appear for introduction into load devices such as read-out meter 26, a computer network, or the like.

In transducers of the ion sensitive glass-electrode type, the output signal E, in response to an abrupt change in the concentration of ions under measurement, will take the general form (1) $$E = A(1 - e^{-kt})$$

where A is the asymptotic value approached by E as the value of the latter changes over the time $kt$, $k$ being a coefficient dependent on the nature of the electrode, and $t$ being the time in seconds. At steady state, i.e., as $e^{-kt}$ becomes vanishingly small, $E = A$.

Differentiating the above with respect to time, one obtains (2) $$\dot{E} = Ake^{-kt}$$

As means for differentiating a signal generally of the form of Equation 1 appearing at input terminal 20 as the output of electrode 22, there is provided a differentiating operational amplifier, indicated generally at 28 and including an input capacitive impedance 30 connected in series between terminal 20 and the input of high-gain inverting amplifier 32. The input and output of the latter are connected through feed-back resistive impedance 34. As is known, the input and output voltages $E_i + E_o$ of an operational amplifier such as 28 are related, to an excellent approximation, as follows:

(3) $$E_o = -\frac{Z_f}{Z_i} E_i$$

$Z_f$ and $Z_i$ being respectively the values of the feed-back and input impedances. If as in FIGURE 1, $Z_f$ is substantially resistive impedance 34 ($R_f$) and $Z_i$ is substantially capacitive impedance 30 ($C_i$), then Equation 3, in operational form, is (4) $$E_o = -SC_i R_f E_i$$

The values of $C_i$ in microfarads and $R_f$ in megohms are preferably so selected that their product is a predetermined value, for example, unity. The operator S becomes a differentiation in the time domain, and the output voltage $E_o$ at output terminal 36 of operational amplifier 28 is then $-\dot{E}_i$.

If the differentiation of Equation 2 is accomplished with a gain of $1/K$, then (5) $$\dot{E} = Ae^{-kt}$$

It would appear that Equation 5 defines an error signal which could be used to correct Equation 1 by summing therewith to provide the value A without any substantial time delay. However, this presupposes that $k$ remains substantially invariant. The use of the first derivative as a corrective error signal is therefore limited to cases where the time response coefficient $k$ is constant.

In practice with a number of transducers, one finds that $k$ is not time-invariant, but assumes during the period $t$, a range of values. In such instance, an error signal $\epsilon$ can be produced which will have a form similar to Equation 5 as follows:

(6) $\quad\quad\quad \epsilon = Ae^{-kt}$ wherein however $k$ is a variable within rather large limits. This can be accomplished by setting $\epsilon$ to be a function of the quotient of the square of the first derivative of E with respect to the second derivative as follows:

(7) $\quad\quad\quad \epsilon = \dot{E}^2/\ddot{E}$ which appears to reduce to (6). Applying Equation 7 as an error signal to Equation 1, one obtains, for the time lag corrected signal $E_c$ to be introduced, for instance, to a read-out device (8) $$E_C = E + \frac{\dot{E}^2}{\ddot{E}}$$

Output terminal 36 is coupled to a second operational amplifier 38 which comprises series input capacitor 40 connected between terminal 36 and the input of second high-gain inverting amplifier 42. The output and input of the latter are connected through feed-back resistor 44. Where the output of amplifier 28 is the first derivative of E, it will be seen that operational amplifier 38 constitutes means for generating the second derivative $\ddot{E}$ of E. The values of capacitor 40 and resistor 44 again are selected so that their product is the same as the product of the feed-back and input impedances of amplifier 28.

The circuit of the drawing includes means such as device 46 for multiplying two electrical signals and dividing the resulting product by a third electrical signal. Analog computation devices of this type are known and commercially available in which the signal amplitudes are multipliers and divider.

Device 46 includes three input terminals 48, 50 and 52, and an output terminal 54, device 46 being so arranged that signal amplitudes received at terminals 50 and 52 are multiplied by one another, the resulting product being divided by the signal amplitude impressed at terminal 48. Consequently, the output of operational amplifier 38 is coupled through resistor 56 to terminal 48, output terminal 36 of operational amplifier 28 being also coupled through parallel resistors 58 and 60, respectively to terminals 50 and 52. In the embodiment shown, it will be appreciated that, resistors 56, 58 and 60 all being equi-valued, the output signal appearing at terminal 54 will then be $\dot{E}^2/\ddot{E}$.

The embodiment of the invention shown in the drawing, also includes a third operational amplifier, indicated generally at 62 and comprising high-gain inverting amplifier 64 having its input and output connected through feed-back resistor 66. The input of operational amplifier 62 is coupled to input terminal 20 through input resistor 68, and to output terminal 54 through input resistor 70. If no gain is desired from operational amplifier 62, inasmuch as the latter is primarily intended to provide a summation and stabilization, then resistor 66 is preferably equal in value to resistor 70 and the latter equal in value to resistor 68.

Thus, the outputs at terminal 54 and at terminal 20 are summed to provide a final output as expressed in Equation 8, the latter closely approximating the asymptotic or steady-state value but being obtained in a fraction of the time ordinarily required for the transducer to reach an equilibrium at which the steady-state value can be ascertained.

Figure 2:
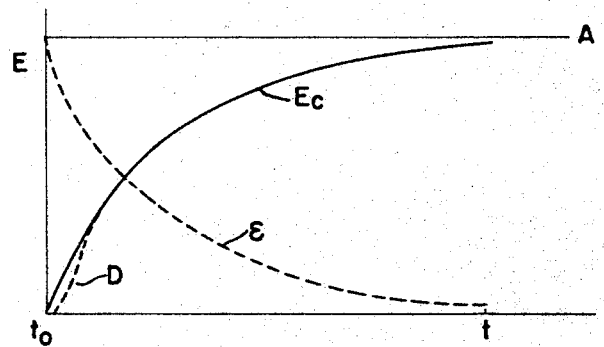
FIGURE 2 is an exemplary graphical representation of the operation of the embodiment of FIGURE 1.

Referring now of FIGURE 2 there will be seen an exemplary graphical representation of the operation of the invention, in which the abscissa is a time axis and the ordinate is in terms of the signal amplitude. The solid line curve identified as $E_c$ is typical of a function of the type of Equation 1, the value A being represented as an approximate asymptote. The curve in dashed line identified as $\epsilon$ is representative of a function such as Equation 7. The symmetry of $E_c$ and $\epsilon$ is quite apparent, and it will readily be appreciated how the sum of the two functions approximates A at almost any time between $t$ and $t_0$, $t-t_0$ being the interval required before the transient value of E reaches approximately the steady-state value A.

It should be noted that $\ddot{E}$ goes to zero as the slope of the response curve E approaches A. Hence it would seem that either $\ddot{E}$ or $\dot{E}^2/\ddot{E}$ must be gated out when its value drops below some predetermined minimum which might be set at a very small portion (e.g. <5%) of the total signal $E_c$. However, this is not necessary inasmuch as devices such as 46 are known which will, for the very small values that B and C will have corresponding to the small value of A, provide a stable output diminishing to substantially zero.

If the response curve $E_c$ is not strictly exponential, it may include a gradual build-up or "toe" portion shown as D in dotted line. Double differentiation to provide E will then result in a bipolar second derivative appearing as an unwanted initial transient. To guard against transients of this type which may result from minor initial deviation of the response curve from the form of Equation 1, Equation 8 should be more properly written as (9) $$E_C = E + \frac{\dot{E}|\dot{E}|}{|\ddot{E}|}$$

Thus, because $\dot{E}$ can take either positive or negative values whilst $|\dot{E}|$ and $|\ddot{E}|$, being absolute, are restricted, the transient will create no problem.

Figure 3:
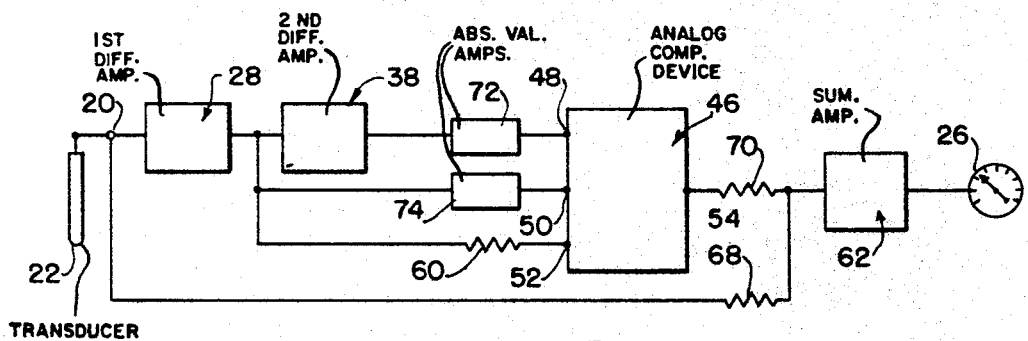
FIGURE 3 is a block diagrammatic representation of a modification of the embodiment of FIGURE 1.

The implementation of Equation 9 can thus result in a form of the invention such as shown in FIGURE 3 wherein like numerals denote like parts with respect to FIGURE 1. It will be seen that between the output of second differentiating operational amplifier 38 and terminal 48 of device 46, an absolute value amplifier 72 has been inserted in series. As is known, if the gain of amplifier 72 is, for example, unity the output to terminal 48 is merely the absolute value of the input to amplifier 72. Similarly, the output of amplifier 28 is coupled through second absolute value amplifier 74 to input terminal 50, although the connection between terminal 52 and the output of amplifier 28 is left unchanged.

Since certain changes may be made in the above apparatus without departing from the scope of the invention herein involved it is intended that all matter contained in the above description or shown in the accompanying drawing shall be interpreted in an illustrative and not in a limiting sense.

What is claimed is:

1. An instrumentation system comprising, in combination, a transducer for providing an electrical output signal which when transient is characterized in that it approaches a steady-state value substantially according to an exponential function in variable time, means responsive to said transient signal for providing an error signal which is the quotient of the square of a first derivative of said transient signal divided by a second derivative of said transient signal, and means for summing said electrical output signal with said error signal.

2. An instrumentation system comprising, in combination, a transducer for providing an electrical output signal which when transient is characterized in that it approaches a steady-state value substantially according to an exponential function in variable time, means responsive to said transient signal for providing an error signal which is the quotient of the multiple of a first derivative of said transient signal times the absolute value of said first derivative divided by the absolute value of a second derivative of said transient signal, and means for summing said electrical output signal with said error signal.

3. In apparatus for measuring magnitudes with a transducer which provides, in response to a change in said magnitude, a transient response signal which approaches a steady-state value in accordance with a variable time exponential function, the combination comprising, means responsive to said transient response signal for providing a first signal as a first derivative of said response signal, means responsive to said transient response signal for providing a second signal as the absolute value of the first derivative of said response signal, means responsive to said first signal for providing a third signal as the absolute value of the second derivative of said response signal, means for providing an error signal as the quotient of the product of the values of said first and second signals divided by said third signal, and means for summing said error signal with said response signal to provide an output signal which approximates said steady-state value.

4. In apparatus for measuring the concentration of ions in solution, the combination comprising, an ion-sensitive glass electrode having a transient electrical output signal which approximately exponentially in time approaches a steady-state value, said value being a function of the concentration of ions in solution with which said electrode is in contact, a first differentiating operational amplifier having its input connected to the output of said electrode, a second differentiating operational amplifier having its input connected to the output of said first amplifier, means connected to the outputs of both said first and second amplifiers for providing an error signal which is the product of the output signal from said first amplifier multiplied by itself, divided by an output signal from said second amplifier, and means for summing the output signal form said electrode with said error signal to provide an output signal which approximates said steady-state value in a fraction of said time.

References Cited
UNITED STATES PATENTS 2,728,522   12/1955   Ernst _____ 235—183

RUDOLPH V. ROLINEC, *Primary Examiner.*

WALTER L. CARLSON, *Examiner.*

C. F. ROBERTS, *Assistant Examiner.*